United States Patent
Flanagan et al.

(10) Patent No.: US 11,295,364 B1
(45) Date of Patent: Apr. 5, 2022

(54) SYSTEM, METHOD, AND COMPUTER-READABLE MEDIUM FOR MATCHING PRODUCTS ACROSS MERCHANTS AND UPDATING REGISTRIES BASED ON OTHER USERS' ACTIONS

(71) Applicant: Baby List, Inc., Oakland, CA (US)

(72) Inventors: August Flanagan, Berkeley, CA (US); Jon Skulski, Berkeley, CA (US); Noah Solnick, Fremont, CA (US)

(73) Assignee: Baby List, Inc., Oakland, CA (US)

( * ) Notice: Subject to any disclaimer, the term of this patent is extended or adjusted under 35 U.S.C. 154(b) by 0 days.

(21) Appl. No.: 16/719,677

(22) Filed: Dec. 18, 2019

(51) Int. Cl.
*G06Q 30/00* (2012.01)
*G06Q 30/06* (2012.01)

(52) U.S. Cl.
CPC ..... *G06Q 30/0629* (2013.01); *G06Q 30/0603* (2013.01); *G06Q 30/0611* (2013.01); *G06Q 30/0633* (2013.01)

(58) Field of Classification Search
CPC .............. G06Q 30/0601–0645; G06Q 30/08
See application file for complete search history.

(56) References Cited

U.S. PATENT DOCUMENTS

| | | | |
|---|---|---|---|
| 7,877,289 B1 * | 1/2011 | Cunningham | G06Q 30/06 705/14.26 |
| 8,510,145 B2 | 8/2013 | Rowland | |
| 2003/0066093 A1 | 4/2003 | Cruz-Rivera et al. | |
| 2003/0131021 A1 * | 7/2003 | Wight | G06Q 30/0601 |
| 2007/0204308 A1 | 8/2007 | Nicholas et al. | |
| 2007/0299736 A1 * | 12/2007 | Perrochon | G06Q 30/0617 705/26.41 |
| 2008/0288332 A1 * | 11/2008 | Altounian | G06Q 30/0641 |
| 2009/0216549 A1 * | 8/2009 | Causey | G06Q 30/02 705/26.1 |
| 2010/0287256 A1 | 11/2010 | Neilio | |
| 2011/0184855 A1 | 7/2011 | Webber et al. | |
| 2011/0185390 A1 | 7/2011 | Faenger et al. | |
| 2012/0150882 A1 | 6/2012 | Deutsch | |

(Continued)

OTHER PUBLICATIONS

Pathak, Bhavik K. "Comparison Shopping Agents and Online Price Dispersion: A Search Cost Based Explanation." Journal of Theoretical and Applied Electronic Commerce Research 7.1 (2012): 64-76. ProQuest. Web. Jul. 15, 2021. (Year: 2012).*

*Primary Examiner* — Jeffrey A. Smith
*Assistant Examiner* — Kennedy Gibson-Wynn
(74) *Attorney, Agent, or Firm* — Lessani Law Group, PC (57) ABSTRACT

The present disclosure relates to a system, method, and computer program for matching products across merchants and updating registries based on other users' actions. A registry product database is maintained with product records that correspond to items that have been added to users' registries. Information is received related to a new registry item added to a user's registry from a merchant source. The system determines whether the new registry item matches a product record in the registry product database. If no match, a new product record is created for the new registry item and associated with a new merchant offer. If a match, the registry item is associated with the matching product record and the associated merchant offer is updated. The registries of all users in the system having a registry item matching the product record are updated to reflect a new merchant source or a different valid price.

18 Claims, 6 Drawing Sheets

EXAMPLE ARCHITECTURE FOR DATABASE (56) References Cited

U.S. PATENT DOCUMENTS

| | | | |
|---|---|---|---|
| 2013/0054404 A1* | 2/2013 | Garcia | 705/26.3 |
| 2013/0117151 A1 | 5/2013 | Macaisa et al. | |
| 2014/0019267 A1* | 1/2014 | Stoliartchouk | G06Q 30/0277 |
| | | | 705/14.73 |
| 2016/0140519 A1* | 5/2016 | Trepca | G06Q 20/0855 |
| 2017/0039578 A1* | 2/2017 | Woddi | G06F 16/24578 |
| 2017/0193591 A1* | 7/2017 | Narasimhan | G06Q 30/0641 |
| 2018/0005304 A1 | 1/2018 | Amacker et al. | |

\* cited by examiner

FIG. 1

EXAMPLE ARCHITECTURE FOR DATABASE

Hi Thomas,

This is your once-a-week baby registry update, letting you know whether a gift is out of stock or has a big price change or a small one. We might not catch everything, but we're keeping a look out for you.

Geared up for baby? Get the best deals for baby & kids this week.

Price Changes
We have updated these prices on your Babylist registry.

Little Remedies Gripe Water | Herbal Supplement | 4 oz. | Pack of 3 | Gently Relieves Stomach Discomfort from Gas, Colic, and Hiccups | Safe for Newborns
$24.99 $20.92

Waterproof Pack N Play Mattress Pad - Fitted Baby Playard Crib Mattress Pad, Mini & Portable Mattresses - Hypoallergenic, Absorbant - 27" x 39" x 5" - Classic White
$19.46 $17.99

FIG. 4C

SYSTEM, METHOD, AND COMPUTER-READABLE MEDIUM FOR MATCHING PRODUCTS ACROSS MERCHANTS AND UPDATING REGISTRIES BASED ON OTHER USERS' ACTIONS

BACKGROUND OF THE INVENTION

1. Field of the Invention

This invention relates generally to registry systems, and more specifically to a system and method for matching products across merchants and updating registries based on other users' actions to provide multiple buying options, price comparison, and availability tracking for items in users' registries.

2. Description of the Background Art

E-commerce has overtaken brick-and-mortar stores as the avenue of choice in making purchases. When people shop online, they want to receive the best deal without having to travel between each brick-and-mortar store to compare prices. In fact, they would also prefer not to have to move between various websites to compare prices, but rather to have all the prices available to them in one location. One method for providing such a functionality is for a provider to arrange a Web crawler to systematically search the internet for all relevant data. This method, however, is resource intensive as the Web crawler would need to constantly visit each merchant to obtain the updated merchant offers.

Therefore, there is a need for a better solution for compiling online merchant offers for products, especially products for a user's registry or wish list. The solution provided in the claimed invention adds products and product information to a datastore through a user adding a product to his or her registry and then, upon determining that the added product information is valid, updates all other users' registries with the newly added information. In this way, the action of each user enhances the system's knowledge of the products and their prices and availability, and automatically populates the registries of all other users in the system with the updated merchant offer so that users in the system are able to make informed decisions. The manner in which the product information is added and stored in the system provides for more efficient storage, faster searching, and more flexibility.

SUMMARY OF THE DISCLOSURE

The present disclosure describes a system, method, and computer program for matching products across merchants and updating registries based on other users' actions to provide multiple buying options, price comparison, and availability tracking for items in users' registries. The method is performed by a computer system that provides user registries ("the system").

A registry product database is maintained with product records that correspond to items that have been added to users' registries. Information is received related to a new registry item added to a user's registry from a merchant source. The system determines whether the new registry item matches a product record in the registry product database. If no match is identified, a new product record is created for the new registry item and associated with a new merchant offer. If the system identifies a match, the registry item is associated with the matching product record and the associated merchant offer is updated. The registries of all users in the system having a registry item matching the product record are updated to reflect a new merchant source or a different valid price.

In one embodiment a method for matching products across merchants and updating registries based on other users' actions to provide multiple buying options, price comparison, and availability tracking for items in users' registries, comprises the following steps:

maintaining a registry product database with product records that correspond to items that have been added to users' registries, wherein product records in the database are associated with one or more registry items and one or more merchant offers, and wherein each merchant offer associated with a product record corresponds to a different merchant source;

receiving information related to a new registry item added to a user's registry from a merchant source, wherein the information includes an item price;

determining whether the new registry item matches a product record in the registry product database;

in response to there being no matching product record, creating a new product record for the new registry item, associating the new product record with a new merchant offer based on the information received for the registry item, and associating the registry item with the new product record;

in response to identifying a matching product record, associating the registry item with the matching product record and creating or updating a merchant offer associated with the matching product record, wherein:

a new merchant offer is created and associated with the matching product record in response to the registry item being added from a new merchant source for the matching product record,         an existing merchant offer is updated in response to the registry item being added from an existing merchant source for the matching product record, and         the item price is associated with the new or updated merchant offer;

in response to the created or updated merchant offer corresponding to a new merchant source or a different valid price, updating the registries of all users in the system having a registry item matching the product record to reflect the new merchant source or the different valid price.

DETAILED DESCRIPTION OF THE PREFERRED EMBODIMENTS

The present disclosure describes a system, method, and computer program for matching products across merchants and updating registries based on other users' actions. The method is performed by a computer system that provides user registries ("the system"), such as the computer system illustrated in FIG. 1.

The system enables a user to add items from any store to his or her registry and then matches the item to the same item available at other retailers. This provides users with multiple buying options, a price comparison, and availability tracking. The system harnesses the user's action of adding products to his or her registry to enhance the system's knowledge of products and their prices and availability and stores that information as a constantly updating product catalog in a database. After validating any price changes, the system is then able to update all other users' registries with the newly added information. The manner in which the product information is added and stored in the system provides for more efficient storage, faster searching, and more flexibility.

Example implementations of the method are described in more detail with respect to FIGS. 1-4C.

Figure 1:
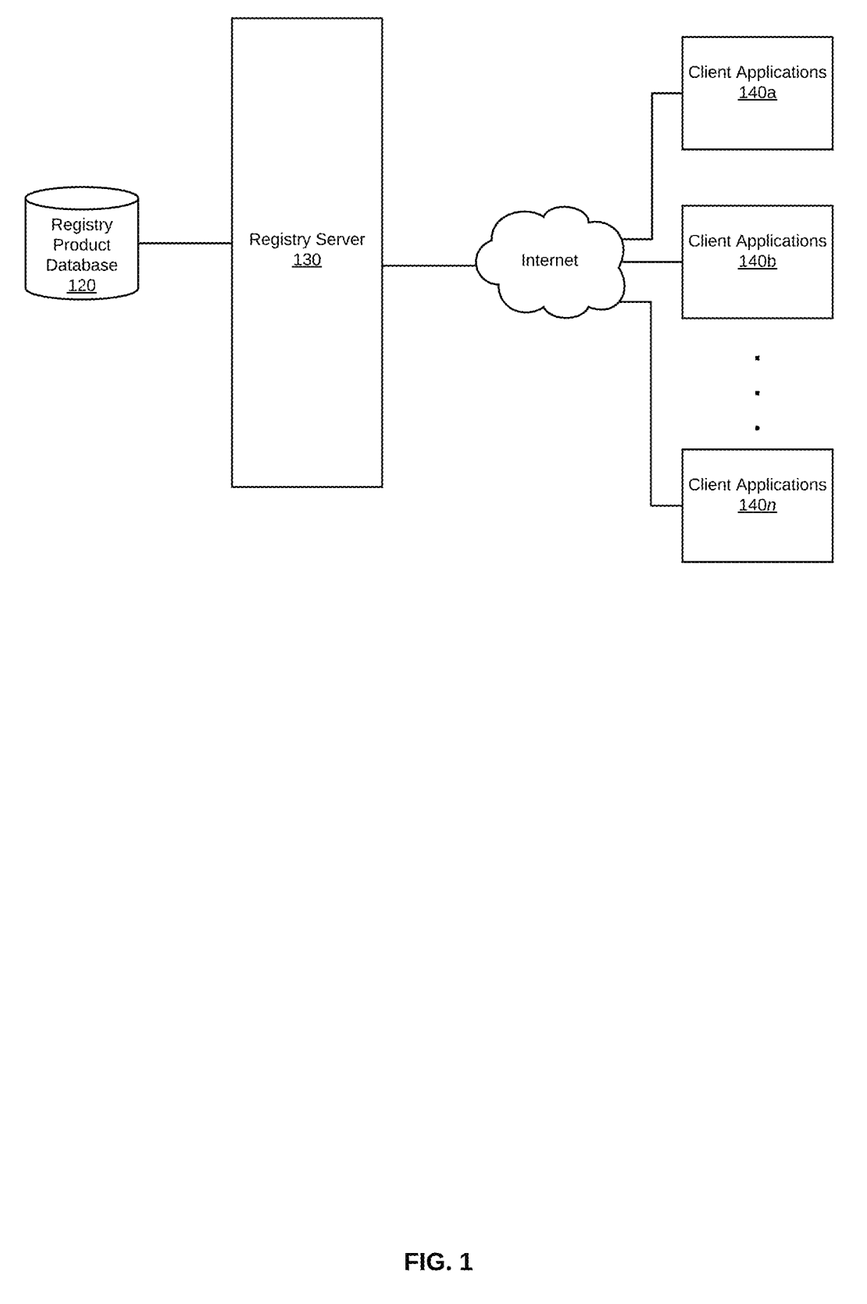
FIG. 1 is a block diagram that illustrates an example software architecture according to one embodiment.

FIG. 1 illustrates an example architecture for a system that performs the methods described herein. However, the methods described herein may be implemented in other systems and are not limited to the system illustrated in FIG. 1. The registry product database 120 stores all the products that have been added to users' registries from merchant sites. The registry server 130 performs the methods described below for matching products across merchants and updating registries based on other users' actions as discussed in greater detail with respect to FIGS. 3A-3B. The registry server 130 communicates over the internet with one or more client applications 140a-140n.

Figure 2:
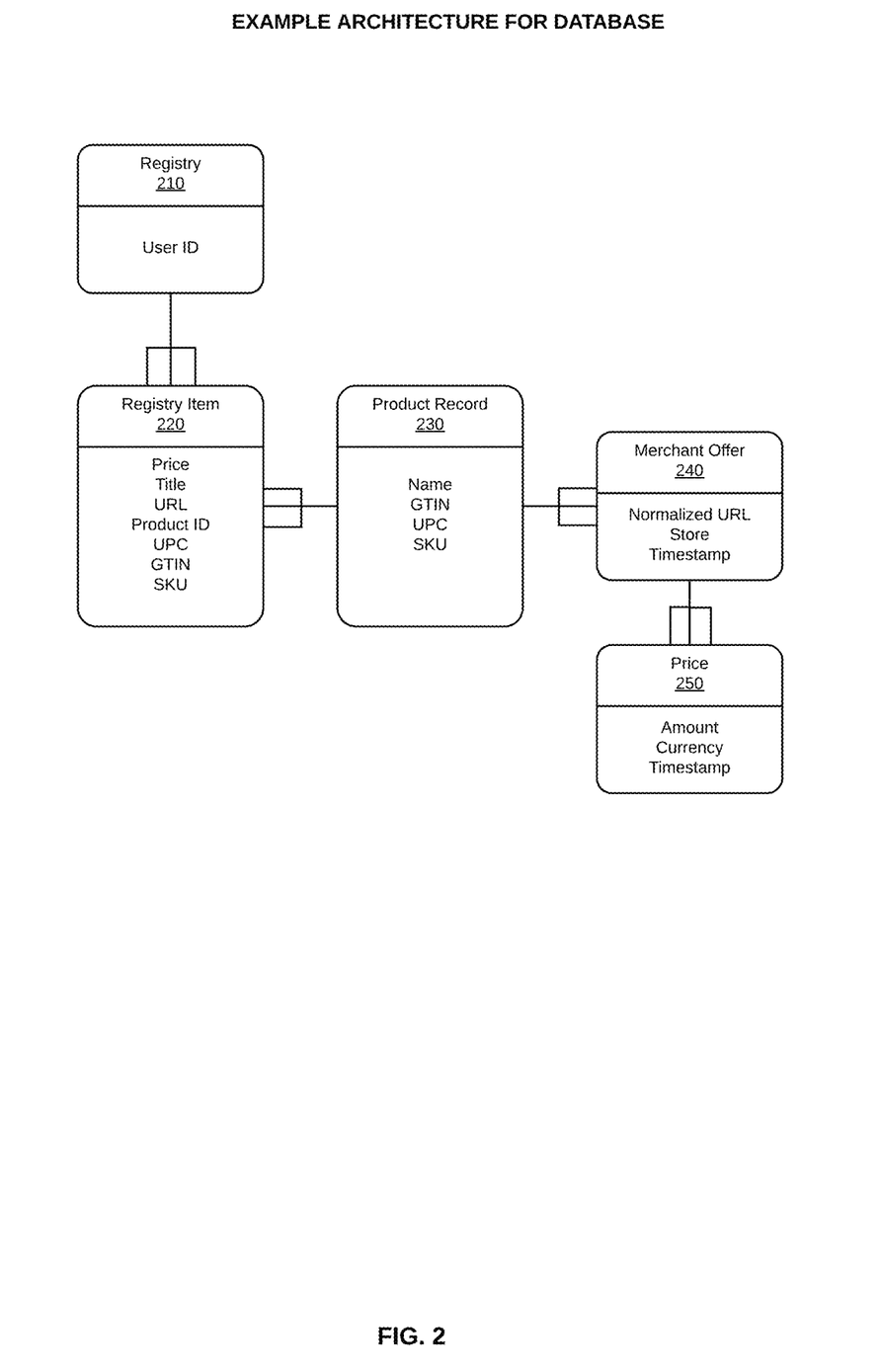
FIG. 2 is a diagram that illustrates an example architecture for a database according to one embodiment.

FIG. 2 illustrates an example architecture for a database (e.g., database 120) according to the methods described herein. However, the methods described herein may be implemented in other databases and are not limited to the database architecture illustrated in FIG. 2. Database 120 stores a plurality of record types. For example, a registry record 210 (which may include user identification information of the user who created the registry), a registry item record 220 (which may include the price, title, URL, product identification, UPC, GTIN, and SKU related to an item added to the user's registry), a product record 230 (which may include the name, GTIN, UPC, and SKU of a product), a merchant offer record 240 (which may include the normalized URL and store related to a merchant offer and a timestamp for when the merchant offer record 240 was created or most recently updated), and a price record 250 (which may include an amount and currency of the price of a product related to the merchant offer 240 and a timestamp for when the price record 250 was created or most recently updated).

As illustrated in FIG. 2, the records in database 120 have a one-to-many relationship. For example, one registry record 210 may be linked to a plurality of registry items 220. A product may have been added to a plurality of user registries and, as a result, one product record 230 may be linked to a plurality of registry item records 220 for a plurality of registry records 210. Many merchants may be selling the same product and, as a result, one product record 230 may be linked to a plurality of merchant offer records 240. Each merchant offer record 240 may be linked to a plurality of price records 250, which represents the price history of an item offered by the merchant, where the most recent price record 250 reflects the current price offered by the merchant.

Figure 3A:
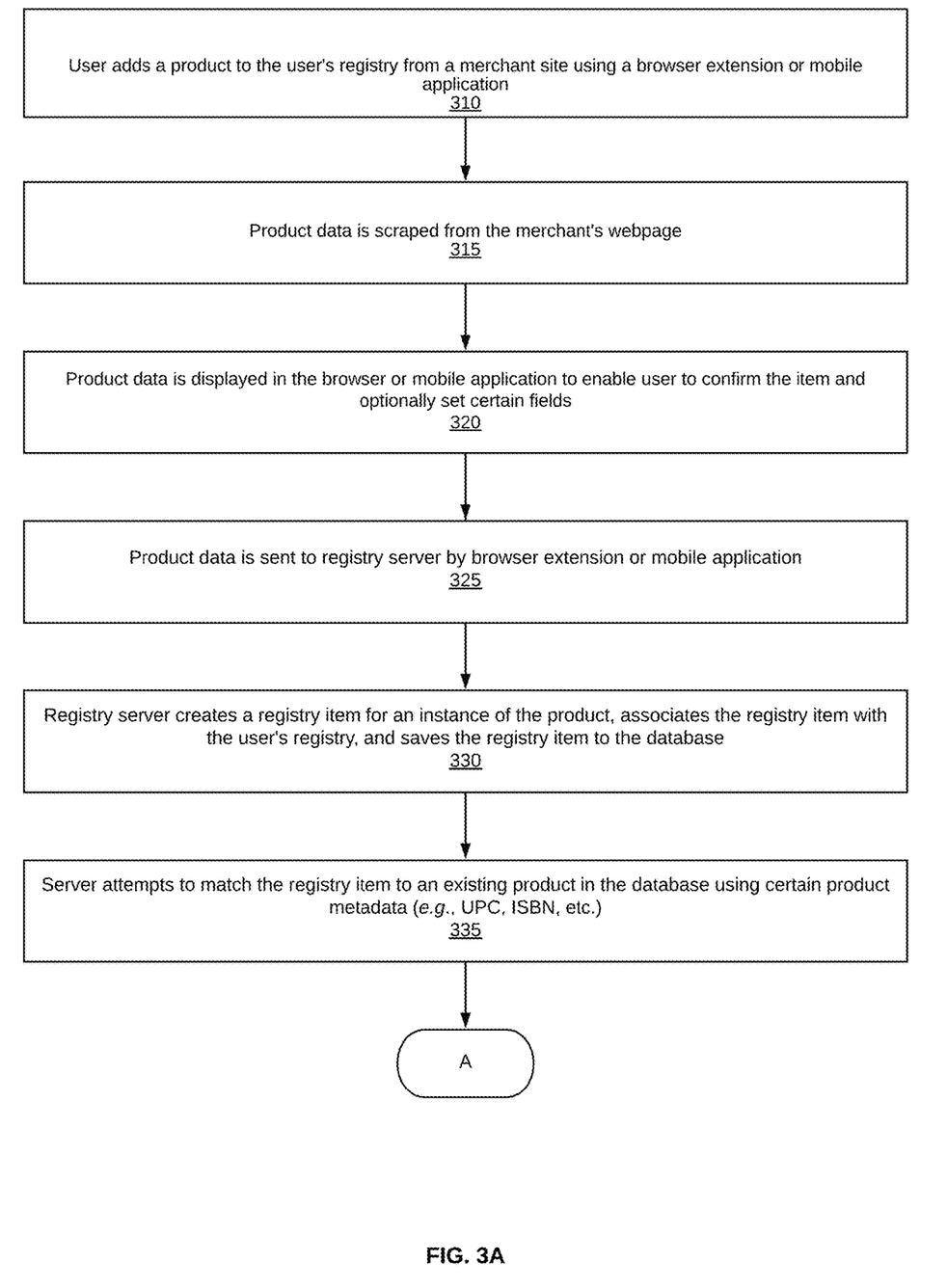
FIGS. 3A-3B are flowcharts that illustrate a method, according to one embodiment, for matching products across merchants and updating registries based on other users' actions to provide multiple buying options, price comparison, and availability tracking for items in users' registries.
Figure 3B:
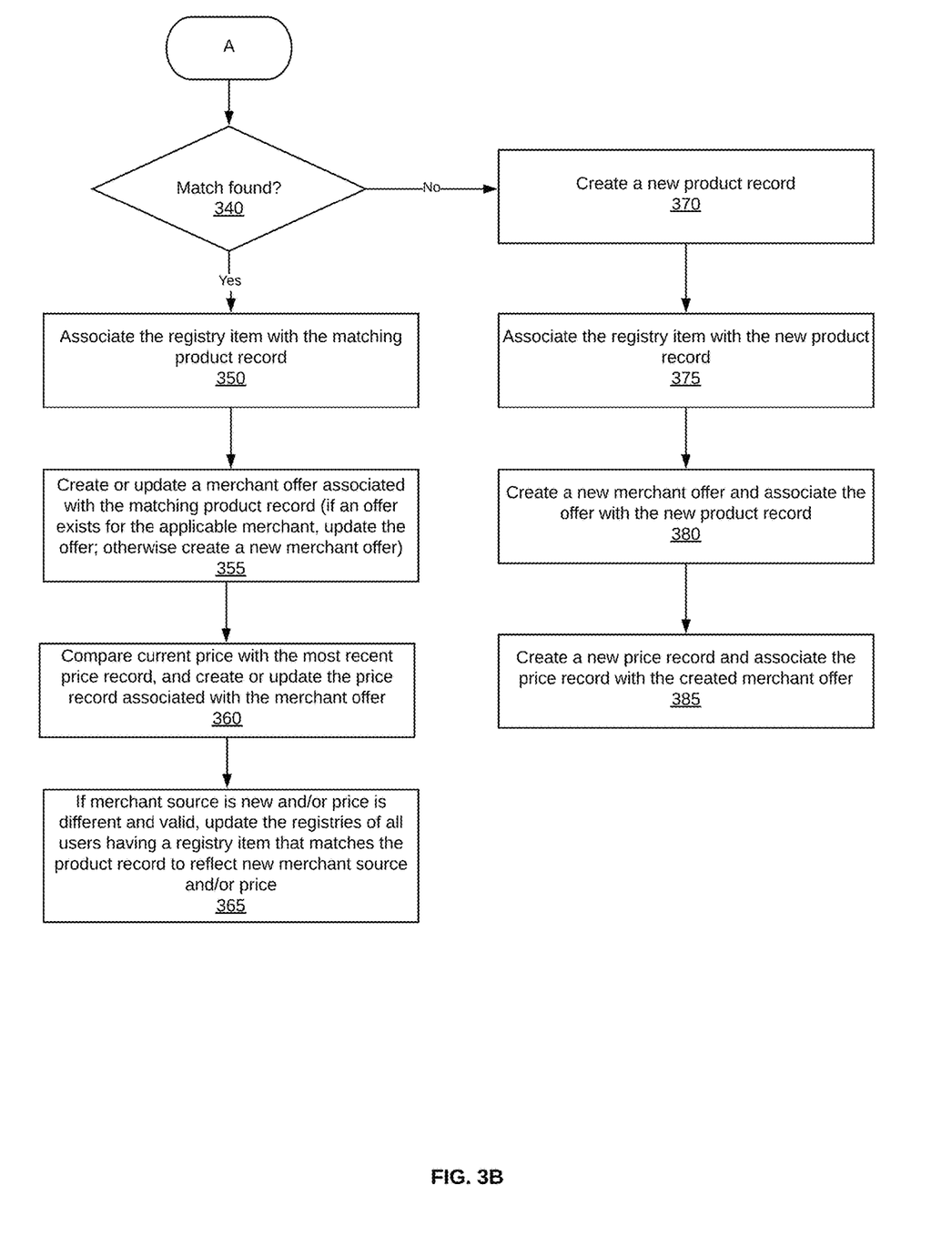

FIGS. 3A-3B illustrates a method, according to one embodiment, for matching products across merchants and updating registries based on other users' actions to provide multiple buying options, price comparison, and availability tracking for items in users' registries. A user adds a product to the user's registry 210 from a merchant site using a browser extension or mobile application 140 (step 310). Product data is scraped from the merchant's webpage (step 315). Examples of product data that may be scraped from the merchant's webpage includes UPC, URL, SKU, color, size, price, availability, title, brand, category, count, ISBN, scent, style, merchant specific identifiers, image URL, etc. Product data is displayed in the browser or mobile application 140 to enable the user to confirm the item and optionally to set certain fields (step 320). Product data is sent to the registry server 130 by the browser extension or mobile application 140 (step 325). The registry server 130 receives the product data and creates a registry item 220 for an instance of the product, associates the registry item 220 with the user's registry 210, and saves the registry item 220 to the database 120 (step 330). In certain embodiments, the system sends an API request to the merchant site for any missing product data. The registry server 130 attempts to match the registry item 220 to an existing product in the database 120 using certain product metadata (e.g., UPC, ISBN, a normalized URL, etc.) (step 335).

The registry server 130 determines whether a match has been found (step 340). In certain embodiments, in response to the new registry item 220 matching a plurality of product records, the system ranks the matching product records and associates the registry items 220 with the highest-ranked matching product. In certain embodiments, ranking the matching product records may be based on which merchant the item was originally added from, where each merchant has a certain priority, and/or based on the offered price (e.g., low to high).

In response to a match being identified, the registry server 130 associates the registry item 220 with the matching product record 230 and creates or updates a merchant offer 240 associated with the matching product record 230 (steps 350, 355). If an offer 240 exists for the applicable merchant, the offer is updated. Otherwise, a new merchant offer record 240 is created and associated with the matching product record 230. The registry server 130 also compares the current price with the most recent price record 250 and creates or updates the price record 250 associated with the merchant offer 240 (step 360). In other words, if the system determines that the product record 230 is for a new merchant, the system will create a new merchant offer record 240 with a new price record 250. If the system determines that the product record 230 is associated with an existing merchant, but a new price, the system will update the timestamp on the existing merchant offer record 240 and create a new price record 250. If the system determines that the product record 230 is associated with an existing merchant and the price is the same, the system will update the timestamps on both the merchant offer record 240 and price record 250.

In certain embodiments, each creation or update of a merchant offer 240 is associated with a timestamp and where any merchant offers 240 having a timestamp older than a threshold time period (e.g., one month) are disabled. In certain embodiments, in response to disabling a merchant offer 240, the system updates any user registries 210 that included the disabled merchant offer 240 to remove the merchant offer 240 from the registries 210. The system also removes any merchant offers 240 in which the product is no longer available.

If the merchant source is new and/or the price is different and valid, the registry server 130 updates the registries 210 of all users having a registry item 220 that matches the product record 230 to reflect the new merchant source 240 and/or price 250 (step 365). In certain embodiments, determining that the item price is a different valid price includes calculating a percentage difference between the item price and a next closest validated price associated with the product record 230, determining that (1) the percentage difference is within a threshold difference, or (2) the item price has been observed a threshold number of times, and determining that all product variant option values were inputted by the user at the time the user added the new registry item 220 to the user's registry 210.

In response to no match being identified, the registry server 130 creates a new product record 230 and associates the registry item 220 with the new product record 230 (steps 370, 375). The registry server 130 also creates a new merchant offer 240, associates the offer 240 with the new product record 230, creates a new price record 250, and associates the price record 250 with the created merchant offer 240 (steps 380, 385).

In certain embodiments, the steps of FIG. 3 are performed in substantially real time. In certain embodiments, steps 335-385 are performed as a batch operation at a later time rather than in real time.

Figure 4A:
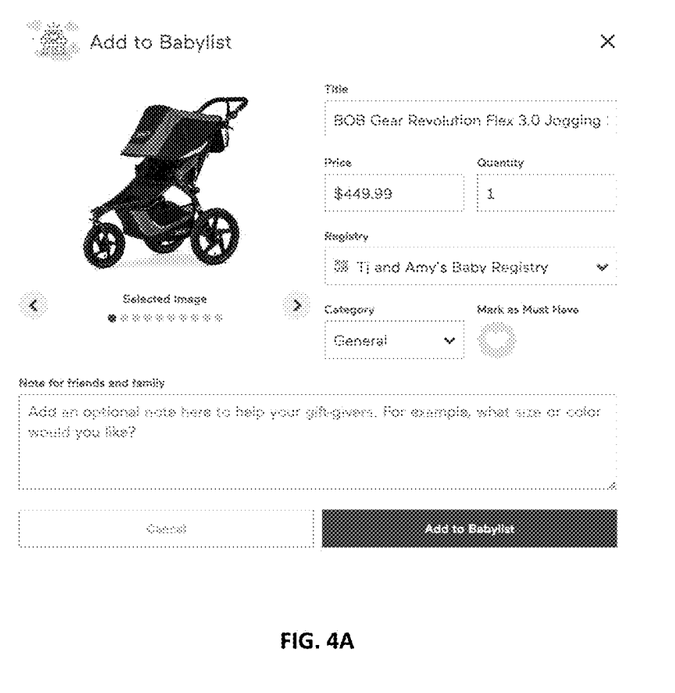
FIGS. 4A-4C are screenshots that illustrate an exemplary user interface and notification according to one embodiment.
Figure 4B:
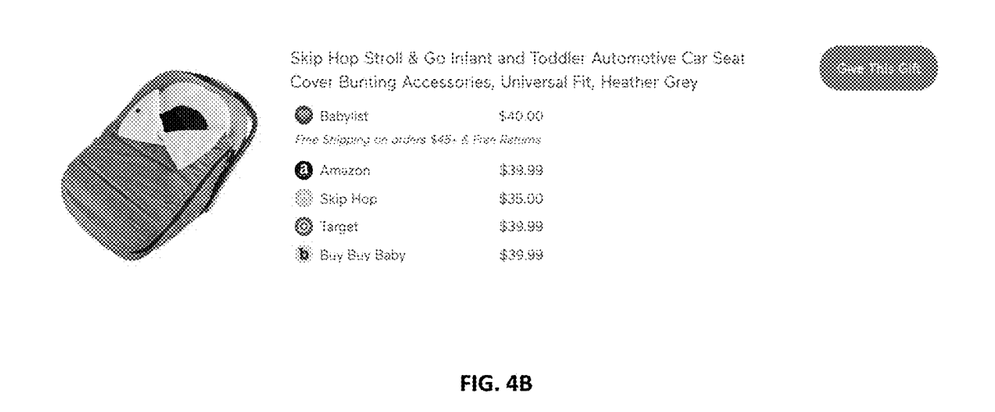
Figure 4C:
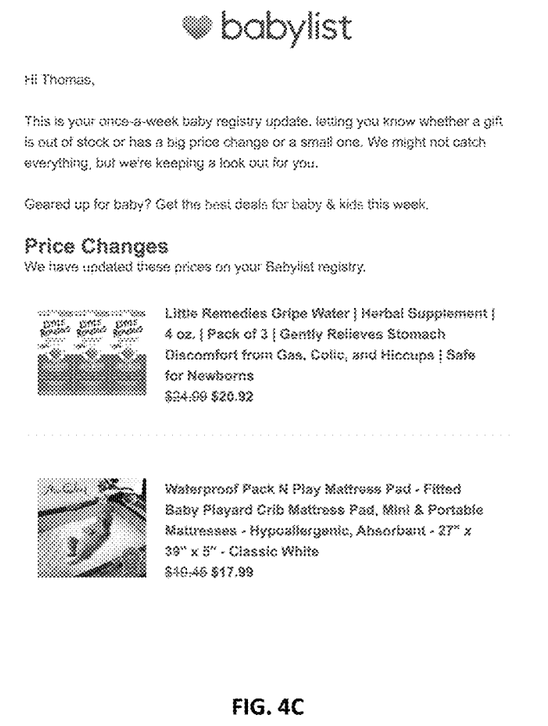

FIG. 4A-4C are screenshots that illustrate an exemplary user interface and notification according to one embodiment. FIG. 4A illustrates a user interface of a browser or mobile application 140 in which product data is displayed to enable the user to confirm the item and optionally to set certain fields as described in step 320. FIG. 4B illustrates a user interface in a browser or mobile application 140 where a product has been added to a user's registry and the system provides multiple buying options (e.g., list of five merchants), price comparison (i.e., between the listed five merchants), and availability tracking (i.e., the system will remove a merchant from the list when the system determines that the product is no longer available at the merchant site). FIG. 4C illustrates that, in addition to updating the price offered by a merchant in the user's registry, the system may also periodically send to the user a notification of changes in the prices of items on the user's registry. This notification may be sent by email, text, push notifications, etc. and may occur weekly, daily, or in real time.

The methods described with respect to FIGS. 1-4C are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system that provides users with registries, for matching products across merchants and updating registries based on other users' actions to provide multiple buying options, price comparison, and availability tracking for items in users' registries, the method comprising:

maintaining a registry product database with product records that correspond to items that have been added to users' registries from various merchant websites, wherein the product records in the database are associated with one or more registry items and one or more merchant offers, wherein each merchant offer associated with a product record corresponds to a different merchant source, wherein the registry product database stores product metadata corresponding to the product records, one or more registry items, and one or more merchant offers, and wherein the product metadata includes a normalized URL;

receiving information related to a new registry item added to a user's registry from a merchant source, wherein the information includes an item price;

determining whether the new registry item matches a product record in the registry product database by scraping product data from a merchant's webpage and comparing product metadata including the normalized URL between the new registry item and the product records in the registry product database, wherein product data is only scraped from the merchant's webpage in response to a new registry item being added to a user's registry from a merchant source and wherein scraping product data further comprises displaying the scraped product data in a browser or mobile application to enable the user to confirm the new registry item and set one or more fields;

in response to there being no matching product record, creating a new product record for the new registry item, associating the new product record with a new merchant offer based on the information received for the new registry item, and associating the new registry item with the new product record;

in response to identifying a matching product record, associating the new registry item with the matching product record and creating or updating a merchant offer associated with the matching product record, wherein:

a new merchant offer is created and associated with the matching product record in response to the new registry item being added from a new merchant source for the matching product record, an existing merchant offer is updated in response to the new registry item being added from an existing merchant source for the matching product record, and the item price is associated with the new or updated merchant offer; and in response to the created or updated merchant offer corresponding to a new merchant source or a different valid price, updating the registries of all users in the system having a registry item matching the product record to reflect the new merchant source or the different valid price.

2. The method of claim 1, wherein each creation or update of a merchant offer is associated with a timestamp and wherein any merchant offers having a timestamp older than a threshold time period are disabled.

3. The method of claim 2, wherein, in response to disabling a merchant offer, updating any user registries that included the disabled merchant offer to remove the merchant offer from the registries.

4. The method of claim 1, wherein determining that the item price is a different valid price comprises:

calculating a percentage difference between the item price and a next closest validated price associated with the product record;

determining that (1) the percentage difference is within a threshold difference, or (2) the item price has been observed a threshold number of times; and determining that all product variant option values were inputted by the user at the time the user added the new registry item to the user's registry.

5. The method of claim 1, wherein registry items are also matched to product records using one or more of the following: UPC and ISBN.

6. The method of claim 1, wherein, in response to the new registry item matching a plurality of product records, ranking the matching product records and associating the registry items with the highest-ranked matching product.

7. A non-transitory computer-readable medium comprising a computer program, that, when executed by a computer system, enables the computer system to perform the following steps for matching products across merchants and updating registries based on other users' actions to provide multiple buying options, price comparison, and availability tracking for items in users' registries, the steps comprising:

maintaining a registry product database with product records that correspond to items that have been added to users' registries from various merchant websites, wherein the product records in the database are associated with one or more registry items and one or more merchant offers, wherein each merchant offer associated with a product record corresponds to a different merchant source, wherein the registry product database stores product metadata corresponding to the product records, one or more registry items, and one or more merchant offers, and wherein the product metadata includes a normalized URL;

receiving information related to a new registry item added to a user's registry from a merchant source, wherein the information includes an item price;

determining whether the new registry item matches a product record in the registry product database by scraping product data from a merchant's webpage and comparing product metadata including the normalized URL between the new registry item and the product records in the registry product database, wherein product data is only scraped from the merchant's webpage in response to a new registry item being added to a user's registry from a merchant source and wherein scraping product data further comprises displaying the scraped product data in a browser or mobile application to enable the user to confirm the new registry item and set one or more fields;

in response to there being no matching product record, creating a new product record for the new registry item, associating the new product record with a new merchant offer based on the information received for the new registry item, and associating the new registry item with the new product record;

in response to identifying a matching product record, associating the new registry item with the matching product record and creating or updating a merchant offer associated with the matching product record, wherein:

a new merchant offer is created and associated with the matching product record in response to the new registry item being added from a new merchant source for the matching product record, an existing merchant offer is updated in response to the new registry item being added from an existing merchant source for the matching product record, and the item price is associated with the new or updated merchant offer; and in response to the created or updated merchant offer corresponding to a new merchant source or a different valid price, updating the registries of all users in the system having a registry item matching the product record to reflect the new merchant source or the different valid price.

8. The non-transitory computer-readable medium of claim 7, wherein each creation or update of a merchant offer is associated with a timestamp and wherein any merchant offers having a timestamp older than a threshold time period are disabled.

9. The non-transitory computer-readable medium of claim 8, wherein, in response to disabling a merchant offer, updating any user registries that included the disabled merchant offer to remove the merchant offer from the registries.

10. The non-transitory computer-readable medium of claim 7, wherein determining that the item price is a different valid price comprises:

calculating a percentage difference between the item price and a next closest validated price associated with the product record;

determining that (1) the percentage difference is within a threshold difference, or (2) the item price has been observed a threshold number of times; and determining that all product variant option values were inputted by the user at the time the user added the new registry item to the user's registry.

11. The non-transitory computer-readable medium of claim 7, wherein registry items are also matched to product records using one or more of the following: UPC and ISBN.

12. The non-transitory computer-readable medium of claim 7, wherein, in response to the new registry item matching a plurality of product records, ranking the matching product records and associating the registry items with the highest-ranked matching product.

13. A computer system for matching products across merchants and updating registries based on other users' actions to provide multiple buying options, price comparison, and availability tracking for items in users' registries, the system comprising:

one or more processors;

one or more memory units coupled to the one or more processors, wherein the one or more memory units store instructions that, when executed by the one or more processors, cause the system to perform the operations of:

maintaining a registry product database with product records that correspond to items that have been added to users' registries from various merchant websites, wherein the product records in the database are associated with one or more registry items and one or more merchant offers, wherein each merchant offer associated with a product record corresponds to a different merchant source, wherein the registry product database stores product metadata corresponding to the product records, one or more registry items, and one or more merchant offers, and wherein the product metadata includes a normalized URL;

receiving information related to a new registry item added to a user's registry from a merchant source, wherein the information includes an item price;

determining whether the new registry item matches a product record in the registry product database by scraping product data from a merchant's webpage and comparing product metadata including the normalized URL between the new registry item and the product records in the registry product database, wherein product data is only scraped from the merchant's webpage in response to a new registry item being added to a user's registry from a merchant source and wherein scraping product data further comprises displaying the scraped product data in a browser or mobile application to enable the user to confirm the new registry item and set one or more fields;

in response to there being no matching product record, creating a new product record for the new registry item, associating the new product record with a new merchant offer based on the information received for the new registry item, and associating the new registry item with the new product record;

in response to identifying a matching product record, associating the new registry item with the matching product record and creating or updating a merchant offer associated with the matching product record, wherein:
- a new merchant offer is created and associated with the matching product record in response to the new registry item being added from a new merchant source for the matching product record,
- an existing merchant offer is updated in response to the new registry item being added from an existing merchant source for the matching product record, and
- the item price is associated with the new or updated merchant offer; and in response to the created or updated merchant offer corresponding to a new merchant source or a different valid price, updating the registries of all users in the system having a registry item matching the product record to reflect the new merchant source or the different valid price.

14. The computer system of claim 13, wherein each creation or update of a merchant offer is associated with a timestamp and wherein any merchant offers having a timestamp older than a threshold time period are disabled.

15. The computer system of claim 14, wherein, in response to disabling a merchant offer, updating any user registries that included the disabled merchant offer to remove the merchant offer from the registries.

16. The computer system of claim 13, wherein determining that the item price is a different valid price comprises:
- calculating a percentage difference between the item price and a next closest validated price associated with the product record;
- determining that (1) the percentage difference is within a threshold difference, or (2) the item price has been observed a threshold number of times; and
- determining that all product variant option values were inputted by the user at the time the user added the new registry item to the user's registry.

17. The computer system of claim 13, wherein registry items are also matched to product records using one or more of the following: UPC and ISBN.

18. The computer system of claim 13, wherein, in response to the new registry item matching a plurality of product records, ranking the matching product records and associating the registry items with the highest-ranked matching product.

* * * * *